W. A. BIGGS.
WHEEL ANTISLIPPING ATTACHMENT.
APPLICATION FILED JULY 17, 1919.
1,418,060. Patented May 30, 1922.
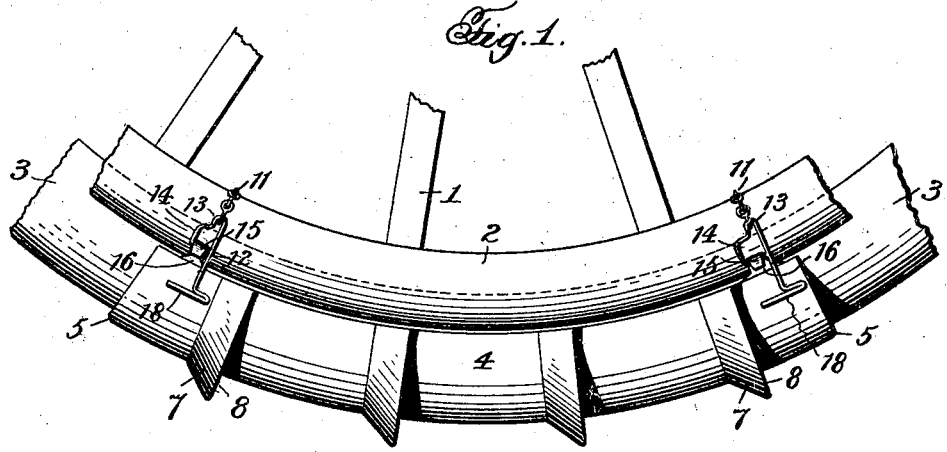
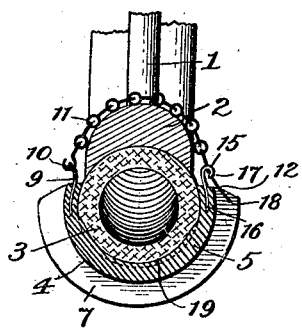 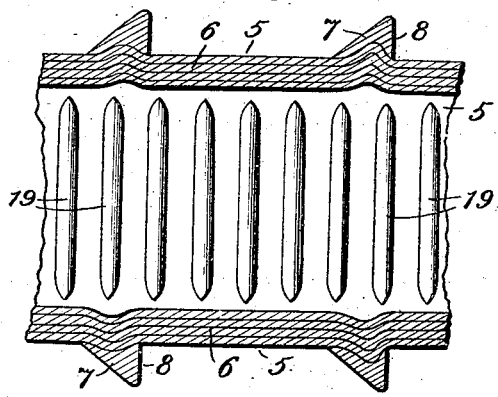
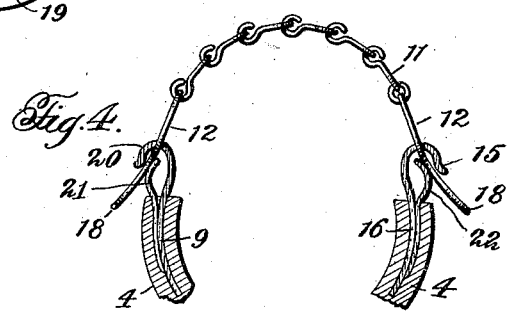
Witness:
Jas. E. Hutchinson
Inventor:
Wm. A. Biggs,
By Milans & Milans
Attorneys.

UNITED STATES PATENT OFFICE.

WILLIAM A. BIGGS, OF MERIDIAN, MISSISSIPPI.

WHEEL ANTISLIPPING ATTACHMENT.

1,418,060. Specification of Letters Patent. Patented May 30, 1922.

Application filed July 17, 1919. Serial No. 311,417.

*To all whom it may concern:*

Be it known that I, WILLIAM A. BIGGS, a citizen of the United States, residing at Meridian, in the county of Lauderdale and State of Mississippi, have invented certain new and useful Improvements in Wheel Antislipping Attachments, of which the following is a specification, reference being had therein to the accompanying drawing.

The invention relates to a traction device or attachment for vehicle wheels, to prevent slipping thereof, and is particularly adapted for application to automobile tires.

Many forms of devices have been proposed for attachment to a vehicle tire to enable a machine under its own traction, to emerge out of mud holes, or other poor traction road surfaces, but as far as I am aware, these devices, generally known as "mud hooks" consist of metallic structures and are adapted to be attached to a tire and provided with traction surfaces. The use of these devices has not been satisfactory, it having been found that the metallic body portions serve to cut or injure the tire, while the said bodies also do not possess sufficient yieldable characteristics to enable the attachment to readily conform to the shape of the tire.

It is an object of the present invention to provide an attachment for vehicle tires overcoming the difficulties encountered in the use of the prior art devices, and consisting of a body portion composed of vulcanized rubber having incorporated therein a reinforcing fabric, which body is fashioned to fit the tire and conform to the shape of its outer surface. The body is also provided with outwardly projecting traction ribs preferably vulcanized therewith so that the entire attachment is pliable and yieldable and may be readily applied to any tire and conform to the shape thereof. By making the device of rubber, the tread portion of a tire is not injured upon its application thereto, and when the attachment is applied to a tire, the same being of a pliable nature will readily conform to the contour thereof irrespective of the size of the tire, the rubber, of course, possessing inherent qualities serving to cause the attachment to cling to a tire when the same is applied thereto.

The invention in a more specific aspect comprises an antislipping attachment of this general character having a suitable body portion composed of relatively hard vulcanized rubber, and formed on its outer surface with a series of spaced projecting traction ribs of a material width, being adapted when the device is applied to a tire to engage a slippery or poor road bed to enable a machine under its own power to emerge from mud holes or other bad traction surfaces. The traction ribs are preferably molded with the body of the device so that the entire article is of a unitary construction and readily conforms to the shape of a tire when applied thereto, additional means being preferably employed consisting of attaching chains for securing the device in place.

In the accompanying drawings, I have shown and described the preferred embodiment of the invention, but it will, of course, be understood that many changes can be made without departing from the same.

In the drawings:

Fig. 1 is a side elevation of the attachment applied to a section of a vehicle wheel.

Fig. 2 is a transverse vertical section through the wheel rim and attachment.

Fig. 3 is a longitudinal section through a portion of the attachment.

Fig. 4 is a fragmentary transverse vertical section through the attachment showing a modified form of means for attaching the device to a vehicle tire.

Referring now more particularly to the drawings wherein like reference characters indicate corresponding parts, the numeral 1 designates suitable wheel spokes being connected with a wheel felly and rim 2 receiving the tire 3. This tire may be of a pneumatic or solid formation, but for the purpose of illustration it is shown as a pneumatic tire.

The anti-slipping device 4 consists of a body part 5 of substantially semi-circular cross section, being composed of vulcanized rubber having embedded or incorporated therein the usual reinforcing fabric 6 to strengthen the said body. The body is of a slightly segmental or curved formation corresponding to the circumferential curve of a vehicle tire and is adapted to surround the tread as well as the sides of the tire when the device is applied thereto as shown in Figure 1 of the drawings. Formed integral with the body 5 are a plurality of radiating traction ribs 7, the fabric 6 of the body passing up into the ribs so as to firmly unite them to the body. These ribs are preferably molded with the body, as before stated, so as to be firmly united thereto and extend entirely around the body. One side of the rib as indicated by the reference character 8 is substantially straight and extends at right angles to its body, while the opposite side is somewhat bevelled producing a rib of a tapering formation.

As a means for securing the device to a vehicle tire, plates 9 are molded or vulcanized within the body at one side having apertures 10 therein receiving a hook portion of a chain 11 passing around the rim of the vehicle, while the opposite end of the chain is formed with a hook portion 12 having an eye 13 near one end receiving the opposite end of the chain, the fastening hook 12 is also formed with an enlarged eye portion 14 adapted to be slipped over the hooked end 15 of a plate 16 that is vulcanized in the opposite side of the body 4. The hooked end 15 of this plate is formed with a bill 17 so as to normally prevent the fastening hook 12 from becoming disengaged therefrom when the device is used, it being observed that the fastening hook 12 is formed with an extending part or handle 18 by which the enlarged eye portion 15 is slipped over the bill of the hook when the device is to be attached to a tire and this handle must be grasped and pulled outwardly slightly to enable the device to be uncoupled from the wheel. The plates 9 and 16 are shown as being disposed at each end of the traction device, but obviously any number of plates necessary can be vulcanized in the body to securely hold the anti-slipping device in place.

To prevent creeping of the device after it has been applied to a tire, the inner surface of the body 5 is provided with slightly raised portions 19 that are adapted to engage the surface of the tire and these raised parts frictionally engaging the tire surface to a material extent prevent a relative creeping of the anti-slipping device, it being understood that the body of the device is composed of vulcanized rubber possessing inherent elastic qualities causing the same to yieldably cling to a tire when it has been applied thereto, thereby bringing the roughened portions 19 into firm contact with the surface of the tire and preventing creeping.

In Fig. 4 of the drawings I have shown a slightly modified form of the means for attaching the device to the vehicle tire. In this form of the invention the plate 9 is formed with a hooked end 20 and a spring plate 21 is secured to the plate 9 and the end thereof is adapted to normally engage the hooked end 20. The plate 16 also has a spring plate 22 secured thereto and this spring plate will normally engage the hooked end 15. In this modified form of the invention each end of the chain 11 is provided with a fastening hook 12 and when the fastening hooks are applied to the hooks 15 and 20 of the plates 16 and 9, respectively, the spring plates 22 and 21 will yield and then snap back into postion to hold the hooks 12 in position against accidental displacement.

The device is primarily intended for application to a tire when the wheels of a vehicle are in a mud hole, or on a very poor traction surface and when in use the traction ribs 7 upon a rotation of the wheel are driven into or engage the muddy surface, preventing slipping or a spinning of the wheels to enable the vehicle to move forward under its own power. The flat sides 8 of the traction ribs upon the rotation of the wheel are embedded in the soft or muddy earth presenting large areas engaging the earth to enable the machine to move forward under this traction by its own power and a spinning of the wheel is of course prevented.

Should a very bad traction surface be encountered more than one of the devices could be applied to a wheel if this is necessary, but in most instances it will be found that the use of a single attachment will suffice.

Having thus described the invention, what I claim is:—

1. An attachment of the character described comprising a body portion consisting of vulcanized rubber having fabric embedded therein, said body portion being of a curved formation to be applied to a vehicle tire and conform to the surface thereof, and spaced integral traction ribs disposed radially of the body, said ribs having a straight wall on one side, and a bevelled wall on the other.

2. In combination with an anti slipping attachment for wheels having perforated plates secured to one edge and hooks to the other edge, of means for securing the attachment to the wheel, said means comprising chains having a hook on one end to engage the openings on the plates on one edge of the body and eyes on the opposite ends to engage the hooked ends of the plates on the opposite edge of the body, said eye portions having an extension forming a handle for engaging and disengaging the eyes from the hooks.

3. In combination with an anti-slipping attachment for wheels having perforated plates secured to one edge and hooks to the other edge, of means for securing the attachment to the wheel, said means comprising chains having a hook on one end to engage the openings in the plates on one edge of the body and eyes on the opposite ends to engage the hooks of the plates on the opposite edge of the body, said eye portions having an offset to receive a link of the chain and an extension forming a handle for engaging and disengaging the eye from the hook.

In testimony whereof I hereunto affix my signature in the presence of two witnesses.

WILLIAM A. BIGGS.

Witnesses:
M. L. McNair,
C. E. McCalmont.